(12) United States Patent
Zhao et al.

(10) Patent No.: US 12,358,823 B2
(45) Date of Patent: Jul. 15, 2025

(54) LOW-CARBON NEAR ZERO EMISSION PROCESS OF INDUSTRIAL WASTE WATER

(71) Applicant: SHANXI UNIVERSITY, Taiyuan (CN)

(72) Inventors: Huazhang Zhao, Taiyuan (CN); Huifang Sun, Taiyuan (CN); Liangjie Wang, Taiyuan (CN); Dandan Zhu, Taiyuan (CN); Jinrui Shi, Taiyuan (CN)

(73) Assignee: SHANXI UNIVERSITY, Taiyuan (CN)

( * ) Notice: Subject to any disclaimer, the term of this patent is extended or adjusted under 35 U.S.C. 154(b) by 0 days.

(21) Appl. No.: 18/923,553

(22) Filed: Oct. 22, 2024

(65) Prior Publication Data

US 2025/0197265 A1 Jun. 19, 2025

(51) Int. Cl.
*C02F 9/00* (2023.01)
*C01D 3/06* (2006.01)
(Continued)

(52) U.S. Cl.
CPC .............. *C02F 9/00* (2013.01); *C01D 3/06* (2013.01); *C01D 5/00* (2013.01); *C02F 1/441* (2013.01);
(Continued)

(58) Field of Classification Search
None
See application file for complete search history.

(56) References Cited

FOREIGN PATENT DOCUMENTS

CN 103011529 A 4/2013
CN 105540967 A 5/2016
(Continued)

OTHER PUBLICATIONS

Boopathy R, Kulpa CF. Trinitrotoluene (TNT) as a sole nitrogen source for a sulfate-reducing bacterium *Desulfovibrio* sp. (B strain) isolated from an anaerobic digester. Curr Microbiol. Oct. 1992;25(4):235-41. doi: 10.1007/BF01570724. PMID: 1368976. (Year: 1992).*

(Continued)

*Primary Examiner* — Chester T Barry
(74) *Attorney, Agent, or Firm* — Hawaii Patent Services; Nathaniel K. Fedde; Kenton N. Fedde

(57) ABSTRACT

A low-carbon near zero emission process of industrial waste water, comprising: S1: entering industrial waste water into a pre-oxidation system to improve biodegradability of organics; S2: after treatment in the pre-oxidation unit, entering the waste water into an anaerobic biological treatment system, sodium chloride and sulfate is deeply removed and carbon sources in the waste water can be used to remove the sulfate and nitrate; S3: entering water output from the anaerobic biological treatment system into a membrane concentration system and membrane concentrated solution enters a nano-filtration salt fractionation system for salt fractionation; and S4: refluxing nano-filtration concentrate solution generated by the nano-filtration salt fractionation system to the anaerobic biologic treatment system for biological desulfurization, or synthesizing the nano-filtration concentrate solution to be sodium persulfate by electro chemical methods, and refluxing proportionately to a waste water pre-oxidation system for use in-situ.

2 Claims, 1 Drawing Sheet

(51) Int. Cl.
*C01D 5/00* (2006.01)
*C02F 1/44* (2023.01)
*C02F 1/52* (2023.01)
*C02F 1/72* (2023.01)
*C02F 1/78* (2023.01)
*C02F 3/28* (2023.01)
*C02F 101/10* (2006.01)
*C02F 101/12* (2006.01)
*C02F 101/16* (2006.01)
*C02F 101/34* (2006.01)
*C02F 103/34* (2006.01)

(52) U.S. Cl.
CPC .............. *C02F 1/442* (2013.01); *C02F 1/444* (2013.01); *C02F 2001/5218* (2013.01); *C02F 1/722* (2013.01); *C02F 1/78* (2013.01); *C02F 3/2846* (2013.01); *C02F 2101/101* (2013.01); *C02F 2101/12* (2013.01); *C02F 2101/163* (2013.01); *C02F 2101/345* (2013.01); *C02F 2103/34* (2013.01)

(56) References Cited

FOREIGN PATENT DOCUMENTS

| CN | 105859019 A | 8/2016 |
| CN | 107032561 A | 8/2017 |
| CN | 111138040 A | 5/2020 |

OTHER PUBLICATIONS

Stephen W Maloney, et al., Anaerobic treatment of pinkwater in a fluidized bed reactor containing GAC, J Haz. Matl., vol. 92, Iss 1, 2002, pp. 77-88, ISSN 0304-3894, https://doi.org/10.1016/S0304-3894(01)00375-2. (Year: 2002).*

Discussion and Correspondence, Mineral Nomenclature, Science, vol. XXXIX, No. 1007, Apr. 17, 1914, p. 575-577 (at left col. p. 576) (Year: 1914).*

* cited by examiner

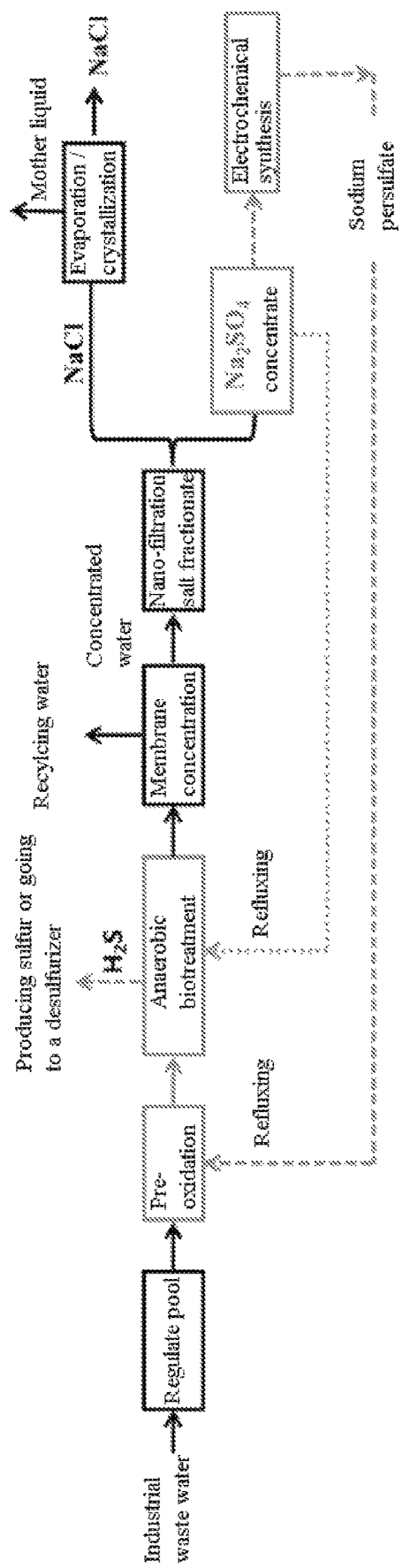

LOW-CARBON NEAR ZERO EMISSION PROCESS OF INDUSTRIAL WASTE WATER

INCORPORATION BY REFERENCE

This application claims the benefit of priority from China Patent Application No. 2023117442677 filed on Dec. 17, 2023, the contents of which are hereby incorporated by reference in their entirety.

TECHNICAL FIELD

The present invention relates to the technical field of waste water treatment, especially a low-carbon near zero emission process of industrial waste water.

BACKGROUND TECHNOLOGY

Near zero emission of waste water is of high significance to eliminating environment pollution, relieving water resource crisis and sustainable development of the society, in recent years, China has posed increasing requirements on pollution treatment of industrial waste water, according to the *Industrial Water Efficiency Improvement Action Plan*, in 2025, unit water consumption of main products in the petroleum chemistry and coal industry shall be reduced for 5% to 15%, the repeated usage rate of the industrial waste water shall be improved to 94%, therefore, near zero emission of industrial waste water has become an inexorable trend.

Currently, industrial waste water near zero emission is done usually by a process of "biological treatment-condensation for repeated use-evaporation and crystallization", finally two product salts of sodium chloride and sodium sulfate are obtained, however, due to the fact that the near zero emission process currently available has not taken into consideration loads for treating organics, nitrogen and sulfate, operation cost for the near zero emission process of waste water is high, and goes beyond what ordinary businesses can afford, specifically: (1) industrially, usually activated sludge methods based on "anaerobic-anoxic-aerobic" AAO are used for organic degradation and nitrification and de-nitrification of nitrogen, however, with the conventional AAO process, only low concentration degradable organics can be treated, however, organic pollutants those are difficult to degrade such as multi-cyclic and heterocyclic compounds have high inhibitory effects on biological metabolisms, consequently, during biological treatment, not only removing efficiency of organics is poor, additional biologically usable carbon sources are to be added for de-nitrification nitrogen treatment, which increases operation cost and carbon emission; (2) small molecule organics left during biological treatment will enter the membrane system, result in serious membrane pollution, in the meanwhile, they will accumulate in the sulfate concentrating solution, as a result, evaporation and crystallization operations of sodium sulfate is not stable, quality of the sodium sulfate product is poor, and a lot of residual solutions are present; (3) with the biological treatment process currently available, sodium sulfate cannot be completely removed, the sodium sulfate will finally accumulate in the membrane condensate solution, for the near zero emission of waste water, the separation, evaporation and crystallization system of sodium sulfate and sodium chloride is required, which is a complex process and consumes significantly; (4) the nitrate left during biological treatment will accumulate in the sodium chloride concentrated solution, resulting in high boiling temperature, energy consumption and a large amount of residual solution during evaporation and crystallization of sodium chloride.

Therefore, only when key foreign matters of organics (especially small molecule organics) and sodium chloride are removed at the front end of waste water treatment, influences thereof on membrane condensation and the evaporation and crystallization system can be reduced; in the meanwhile, by reducing at a low cost the sulfate concentrate solution, addressing the problem of difficult separation and crystallization of sodium chloride, and reducing the subsequent evaporation and crystallization loads and the amount of the residual solution, energy saving and carbon reduced near zero emission of waste water can be realized.

In view of this, the present invention provides a novel low-carbon near zero emission of industrial waste water, by providing a pre-oxidation unit at a front end of the biological treatment system, biological usability of organics those are difficult to degrade in the waste water can be improved; further, by building a highly efficient anaerobic biological treatment system, carbon sources in the waste water can be fully used, sulfate and sodium chloride can be biologically removed and will not enter the evaporation and crystallization system; by treating the water with anaerobisms, high quality regenerated water can be produced by the membrane condensation system; after salt fractionation of the membrane condensation solution by the nano-filtration salt fractionation system, applying subsequent treatment on the nano-filtration condensation water (sodium chloride condensate water) without taking sulfate as the by-product, refluxing to the anaerobic unit for biologic desulfurization or synthesizing persulfate by electrochemical methods, and refluxing the same to the waste water pre-oxidation unit for usage in situ.

The innovative process proposed in the present invention can be used to reduce the aeration energy consumption and external carbon-source demands in the biological treatment process of waste water significantly, in the meanwhile, the problem that evaporation and crystallization of the sulfate concentrate solution is done complicatedly and has high energy consumption, the amount of evaporation and crystallization loads and carnallite (potential dangerous waste) generated during near zero emission of waste water is reduced to a great degree, and a simple, efficient and feasible novel route is provided for realizing low-carbon near zero emission of industrial waste water.

The information disclosed in this part is only intended to help understanding of the background of the present invention and shall not be construed as implying that the general knowledge that those of ordinary skill in the art knows the information in any form.

SUMMARY OF THE INVENTION

In view of the deficiency of the prior art, the present invention aims to provide a novel near zero emission of industrial waste water, with the process, low-cost reduction of organics, sodium chloride and sulfate is done at the front end of near zero emission of the waste water, subsequent evaporation and crystallization loads and residual solution can be reduced, in the meanwhile, the problem that separation and crystallization of the sulfate is difficult and energy consumption thereof is high can be solved.

The technical solutions of the present invention are as following: a novel low-carbon near zero emission process of industrial waste water, comprising:

S1: entering industrial waste water into a pre-oxidation system via a regulating pool, giving pre-oxidation reaction in a continuous stirred tank reactor (CSTR), entering the industrial waste water through a bottom portion of the CSTR and flowing out through a top portion; entering oxidants through the bottom portion of the CSTR;

Further, an oxidation degree of the waste water is controlled by categories, amounts and HRT of the oxidants;

Further, the oxidation degree of the waste water is judged comprehensively according to biological usability of organics (of the oxidized waste waste) and salinity (a TOC loss of the oxidized waste water);

Further, a COD of the waste water is more than 200 mg/L, and organics in the waste water comprise aromatic nucleus, heterocyclic, cyano-group, nitro-group and halo toxic functional groups those are difficult to degrade;

Preferably, the oxidants comprise any one or combination of ozone, hydrogen peroxide and sodium persulfate.

Preferably, a $BOD_5$/COD content in the oxidized waste water after oxidation is 0.38~0.47.

Preferably, a TOC loss rate of the oxidized waste water is less than 8~15%.

Preferably, HRT during oxidation is 0.3~2 h.

S2: after treatment in the pre-oxidation unit, entering the waste water into an anaerobic biological treatment system, microorganisms use carbon-source in the waste water as an electron donor, by anaerobic de-nitrification and sulfate reduction, sodium chloride and sulfate is deeply removed and will not enter an evaporation and crystallization system.

Further, the anaerobic biologic treatment system uses any of UASB, ABR, CSTR and an anaerobic biofilter anaerobic reactor;

Further, partitions are provided in the anaerobic reactor or a cascade reactor for partitioned enrichment of denitrifying bacteria and sulfate reducing bacteria;

Further, at a top portion of the anaerobic reactor an $H_2S$ air separation and recycling apparatus is provided;

Preferably, a concentration of sludge in the anaerobic reactor falls into a range of 7~20 MLSS g/L;

Preferably, a pH value in the anaerobic reactor is 5.5~7.8;

Preferably, DO<0.3 mg/L, ORP≤−300 mV;

Preferably, HRT is 10~120 h;

Preferably, a COD volume load is 0.3~10 kgCOD/($m^3$·d), a total nitrogen volume load is 0.02~3.5 kgN/($m^3$·d) and a sulfate load is 0.03~1.2 kg $SO_4^2$-/($m^3$·d);

Preferably, $H_2S$ generated during anaerobic biologic desulfurization can be used to produce sulfur by Fe(III) based oxidants;

Preferably, the $H_2S$ generated during anaerobic biologic desulfurization can be combined to a desulphurization tower for treatment by an air separation and collection apparatus.

S3: entering water output from the anaerobic biological treatment system into a membrane concentration system, removing large molecule substances, particles, colloidal matters and soluble matters, generating high quality regenerated water, giving salt fractionation treatment to the concentration solution generated by the membrane concentration system by a nanofiltration system.

Further, the membrane concentration system comprises an ultrafiltration system and a reverse osmosis system;

Further, water generated during anaerobic biological treatment is treated first by the ultrafiltration system and treated subsequently by the reverse osmosis system;

Preferably, an ultrafiltration film used by the ultrafiltration system comprises any one or combination of a hollow-fibre membrane, a plate ultrafiltration membrane and a tubular membrane, a range of a filter pore size is 0.02~0.05 μm, a membrane flux is 10~30 L/(m·h) and a trans-membrane pressure drop is 0~50 kpa;

Preferably, the reverse osmosis film used in the reverse osmosis system comprises any one or combination of a hollow-fibre membrane, a spiral membrane, a frame-type membrane and a tubular membrane, a system operation pressure is 0.1~5.0 MPa and an operation temperature is 10~50° C.;

Preferably, a nanofiltration membrane of the nanofiltration salt fractionation system comprises any one or combination of a spiral filter membrane, a hollow-fibre membrane, a tubular filtration membrane and a plate filter membrane, membrane entrapped molecular weights are 100~1000 Da, transmission of monovalent salts through the nanofiltration membrane is more than 85%, and transmission of bivalent salts is less than 15%, and an operation pressure ranges from 1~15 MPa.

S4: refluxing nano-filtration concentrate solution generated by the nano-filtration salt fractionation system to the anaerobic biologic treatment system for biological desulfurization, or synthesizing the nano-filtration concentrate solution to be sodium persulfate by electro chemical methods, and refluxing proportionately to a waste water pre-oxidation system for entering in-situ water generated during nanofiltration into the evaporation and crystallization system to produce sodium chloride.

Further, where a concentration of sulfur in the nanofiltration concentrate water is less than 5 g/L, refluxing the same to the anaerobic biological treatment system for biological desulfurization;

Preferably, a reflux ratio of refluxing the nano-filtration concentrate water to the biological treatment system is 20~200%;

Further, where the concentration of sulfur in the nano-filtration concentrate water is less than 5 g/L, synthesizing the same to the sodium persulfate by the electro chemical methods, and refluxing to the waste water pre-oxidation system for usage in-situ proportionately;

Further, electrochemical synthesis of the sodium persulfate is done is a diaphragm cell, the diaphragm cell comprises primarily an anode pool, a diaphragm, a cathode pool and a stirrer; entering the nano-filtration concentrate water into an anode unit of the diaphragm cell for preparing the sodium persulfate;

Preferably, a material for preparing an anode of the diaphragm cell comprises a Pt electrode or a boron-doped diamond electrode;

Preferably, a material for preparing a cathode of the diaphragm cell comprises a stainless steel electrode or a graphite electrode;

Preferably, the diaphragm comprises a cation-exchange membrane;

Preferably, an electrolytic solution in the cathode pool comprises sulphuric acid 15~30% and electrolyzing cyclically and intermittently electrolyte at a constant flow rate of 5~20 L/min;

Preferably, a current strength and electrolyzing time during electrolyzing and synthesizing the sodium chloride is determined by a concentration of the sulfur in the nanofiltration concentrate water;

Further, for the nano-filtration concentrate water with the concentration of the sulfur 5~10%, a current density is 30~500 mA/$cm^2$, and the electrolyzing time is 60~120 min;

Further, for the nano-filtration concentrate water with the concentration of the sulfur 10~40%, the current density is 30~500 mA/$cm^2$ and the electrolyzing time is 120~300 min;

Preferably, evaporation and crystallization of the sodium chloride is done by a mechanical evaporation, condensation, evaporation, condensation and crystallization apparatus or a composite evaporation condensing and crystallization apparatus; further comprising a dewatering apparatus, and dewatering is done by centrifuge dewatering or pressure filtration dewatering.

Beneficial effects of the present invention:
(1) With the present process, a pre-oxidation unit is provided at a front end of waste water biological treatment, by pre-oxidation, oxidation treatment is given to toxic functional groups those are difficult to degrade containing aromatic nucleus, heterocyclic, cyano-groups, nitro-groups and halo groups, biological usability of organics those are difficult to degrade in the waste water can be improved;
(2) With the present process, a highly efficient anaerobic biological treatment system is used, sulfate and nitrate can be removed by using the carbon-sources in the waste water, in this way, not only synchronous deep removal of carbon, nitrogen and sulfur in the waste water can be removed, entering of the sulfate and the nitrate in the evaporation and crystallization system can be avoided, and treating loads for subsequent evaporation and crystallization can be efficiently reduced;
(3) with the present process, sodium sulfate is no longer a by-product, instead, the sulfate concentrate solution is refluxed to the anaerobic biologic treatment unit for biological desulfurization, or the sodium sulfate concentrate solution is synthesized to be persulfate for usage in-situ by electrochemical methods, in this way, not only the problem that the evaporation and crystallization process of sodium sulfate is complex and has a high energy consumption, evaporation and crystallization loads and carnallite generated can be significantly reduced; and
(4) It is easy to implement the present process, the process flow is short, energy consumption and expense is low, and the present process is suitable for low-carbon near zero emission of a plurality of industrial waste water.

BRIEF DESCRIPTION OF DRAWINGS

FIG. 1 shows a flow diagram of a novel low-carbon near zero emission of industrial waste water according to the present invention.

EMBODIMENTS

Hereinafter a further description will be given to the present invention in conjunction with the embodiments.

Embodiment 1

Low-carbon Near Zero Emission of Coking Waste Water in an Industrial Park

The phenol and cyanogen waste water in a coke oven plant in an industrial park with the process according to the present invention, the COD of the waste water was 3120 mg/L, the sulfate content was 514.9 mg/L, the nitrate content was 138.6 mg/L, the pH value 8.48, the temperature 65° C., and the B/C value 0.22.

First of all, introducing the coking waste water into the pre-oxidation treatment unit, using the persulfate synthesized using conventional electrochemical systems as oxidants, adding 3 g/L, with the thermo energy in the coking waste water, by thermo activating the persulfate and generating sulfate radicals and hydroxyl radicals, reacting the radicals with the organics those were difficult to degrade, by hydrogen abstraction actions, electron transfer or addition, loops and bonds in the organics those were difficult to degrade were broken, and the organics were decomposed to be small molecule matters, after mechanically stirring for 60 min (500 rpm), pre-oxidation was done, the COD, sulfate, nitrate and B/C of the water after pre-oxidation treatment reached respectively 3670 mg/L, 597.6 mg/L, 126.6 mg/L and 0.4 and the biodegradability of the water was obviously improved.

Pumping the water output by the pre-oxidation pool to a UASB reactor, adjusting conditions of anaerobic reaction to ensure that the soluble oxygen concentration is no more than 0.5 mg/L, the oxidation-reduction potential is no more than −300 mv, and maintaining the reaction temperature to be 30±1° C., in the meanwhile, controlling the hydraulic retention time to be 30 hours, further, draining the sludge periodically and maintaining the age of the anaerobic sludge is 25 days, maintaining the concentration of the sludge in the reactor to be 15-18 g/L, giving mechanical stirring reaction at a speed of 500 rpm, the biotreated effluent COD, sulfate and nitrate were respectively 330.7 mg/L, 38.1 mg/L and 27.9 mg/L, highly efficient extraction of the organics, nitrate and sulfate, reached respectively 89.4%, 92.6% and 79.9%.

After treating the anaerobically treated water with the membrane concentration unit, the effluent was recycled, the membrane concentration solution entered the nano-filtration salt fractionation unit, and nano-filtration water containing primarily sodium chloride and nano-filtration concentrate water containing primarily sulfate was obtained, wherein the nano-filtration water was transported to the evaporation and crystallization unit to obtain high quality sodium chloride, and the nano-filtration concentrate water entered the conventional electrochemical synthesizing unit to synthesize sodium persulfate and was refluxed to the pre-oxidation unit for waste water pretreatment.

Embodiment 2

Low-carbon Near Zero Emission of Kaliferous Waste Water of a Printing and Dyeing Company The present invention was used for treating the kaliferous waste water from a printing and dyeing company, wherein the COD of the waste water was 23270 mg/L, the sulfate content was 1264.8 mg/L, the nitrate content was 764.2 mg/L, the pH value was 12, the temperature was 35° C. and the B/C value was 0.18.

First of all, introducing the kaliferous waste water into the pre-oxidation treatment unit, using the ozone as the oxidant with an amount of 21.7 mg/L, in 60 min, the pre-oxidation was done, the B/C value of the pre-oxidized output water reached 0.39 and the biodegradability of the output water was apparently improved.

Pumping the pre-oxidized output water into a UASB reactor, adjusting conditions of anaerobic reaction to ensure that the soluble oxygen concentration was no more than 0.5 mg/L, the oxidation-reduction potential was no more than −300 mv, maintaining the reaction temperature at 30±1° C., controlling the hydraulic retention time to be 60 hours, further, draining the sludge periodically and maintaining the age of the sludge to be 23 days, maintaining the sludge concentration in the reactor to be 25~30 g/L, allowing mechanical stirring reaction at a speed of 500 rpm, removing the pollutants taking use of the differences in abilities of the microorganisms in gaining and losing electrons at different valence states of elements, the COD, sulfate and nitrate of the biotreated effluent were respectively 4607.5 mg/L, 125.5 mg/L and 209.4 mg/L, the effective removal rate of organics, nitrate and sulfate were achieved, which were respectively 80.2%, 91.4% and 72.6%.

For the anaerobic treated water, after being treated by the membrane concentration unit, the effluent was recycled, the membrane concentration solution entered the nano-filtration salt fractionation unit, and obtained the nano-filtration effluent containing primarily sodium chloride and the nano-filtration concentrate water containing primarily sulfate, wherein, the nano-filtration water was transported to the evaporation and crystallization unit to obtain high quality sodium chloride; while the nano-filtration concentrate water was refluxed to the anaerobic biological treatment unit for biological desulfurization treatment.

The foregoing is a detailed description on the embodiments of the present invention, however, the present invention is not limited to the foregoing embodiment, in the range of the knowledge that those skilled in the art have, a variety of changes can be made without departing from the essence of the present invention.

The invention claimed is:

1. A method of processing industrial waste water, comprising:
    S1: feeding the industrial waste water into a regulating tank of an oxidation system, and then oxidizing toxic functional groups, wherein each of the functional groups is selected from the group consisting of a) aromatic compounds, b) heterocyclic organics, and c) toxic refractory pollutants with cyano (-CN), nitro ($-NO_2$), or halogenated (-X) substituents;
    S2: after treatment in the oxidation system, feeding the waste water into an anaerobic biological treatment system, wherein anaerobic de-nitrification and sulfate reduction occurs and sodium chloride and sulfate are removed, and hydrogen sulfide generated during anaerobic biological processes is used to produce sulfur or fed to a desulfurization tower for treatment;
    S3: feeding water effluent from the anaerobic biological treatment system into a membrane concentration system comprising an ultrafiltration system and a reverse osmosis system, wherein regenerated water discharged by the membrane concentration system is recycled for industrial use and membrane retentate enters a nano-filtration desalination system for salt fractionation in which a nano-filtration concentrate solution is produced; and
    S4: refluxing the nano-filtration concentrate solution generated by the nano-filtration desalination system to the anaerobic biological treatment system, or reacting sodium sulfate water present in the nano-filtration concentrate solution to be sodium persulfate by electro chemical methods, and refluxing proportionately to the oxidation system for use in-situ and feeding water generated during nano-filtration into the evaporation and crystallization system to produce sodium chloride;
    wherein, oxidation of the waste water in step S1 is done in a continuous stirred reactor and oxidation degree of the waste water is controlled by types, amounts and HRT of the oxidants; and the oxidation degree of the waste water is judged by biological usability of organics in the water based on $BOD_5$ (biological oxygen demand over 5 days)/COD (chemical oxygen demand) of the oxidized waste water and salinity;
    wherein, the oxidants comprise any one or combination of ozone, hydrogen peroxide and sodium persulfate; a $BOD_5$/COD content in the oxidized waste water after oxidation is 0.38~0.47; and an HRT during oxidation is 0.3~2 h;
    wherein, the anaerobic biological treatment system in step S2 comprises an anaerobic reactor selected from upflow anaerobic sludge blanket (UASB), anaerobic baffled reactor (ABR), continuous agitated-tank reactor (CSTR) and an anaerobic biofilter reactor; microorganisms use carbon-source in the waste water as an electron donor, anaerobic de-nitrification and sulfate reduction occurs, sodium chloride and sulfate are removed; and partitions are provided in the anaerobic reactor or a cascade reactor for partitioned enrichment of denitrifying bacteria and sulfate-reducing bacteria;
    wherein, a pH value in the anaerobic reactor is 5.5~7.8; HRT is 10~120 h, DO<0.3 mg/L, ORP≤−300 mV, temperature 28~35° C., a COD volume load is 0.3~10 kgCOD/($m^3$·d), a total nitrogen volume load is 0.02~3.5 kgN/($m^3$·d) and a sulfate load is 0.03~1.2 kg $SO_4^{2-}$/($m^3$·d);
    wherein, for the nano-filtration concentrate solution with a sodium sulfate concentration less than 5 g/L, refluxing to the anaerobic biological treatment system for biological desulfurization; for nano-filtration concentrate solution with the sodium sulfate concentration more than 5 g/L, synthesizing sodium persulfate by electrochemical methods, and refluxing to the oxidation system of the waste water for use in-situ;
    wherein, electrochemical synthesis of the sodium persulfate is done in a diaphragm cell, the diaphragm cell comprises an anode tank, a diaphragm, a cathode tank and a stirrer; entering the nano-filtration concentrate solution into an anode unit of the diaphragm cell for preparing the sodium persulfate; a material for preparing an anode of the diaphragm cell comprises a Pt material or a boron-doped diamond material; a material for preparing a cathode of the diaphragm cell comprises a stainless steel material or a graphite material; and the diaphragm comprises a cation-exchange membrane;
    wherein, a current strength and electrolyzing time during electrolyzing and synthesizing the sodium chloride is determined by a concentration of the sulfur in the nano-filtration concentrate water such that, when the nano-filtration concentrate solution has a sulfur concentration of 5~10%, a current density is 30~500 mA/$cm^2$, and the electrolyzing time is 60~120 min; and when the nano-filtration concentrate solution has a sulfur concentration of 10~40%, the current density is 30~500 mA/$cm^2$ and the electrolyzing time is 120~300 min.

2. The method according to claim 1, wherein, the ultrafiltration system in the membrane concentration system is connected with the anaerobic biological treatment system to remove substances, particles and colloid matters in the anaerobic biological treatment system and with the reverse osmosis system, the reverse osmosis system removes soluble matter to produce the regenerated water, the membrane retentate is reverse osmosis concentrate water, and the nano-filtration desalination system is configured to remove monovalent salts and bivalent salts.

* * * * *